F. A. McCOMBER.
CAR DOOR.
APPLICATION FILED MAY 5, 1909.
954,326.
Patented Apr. 5, 1910.
2 SHEETS—SHEET 2.
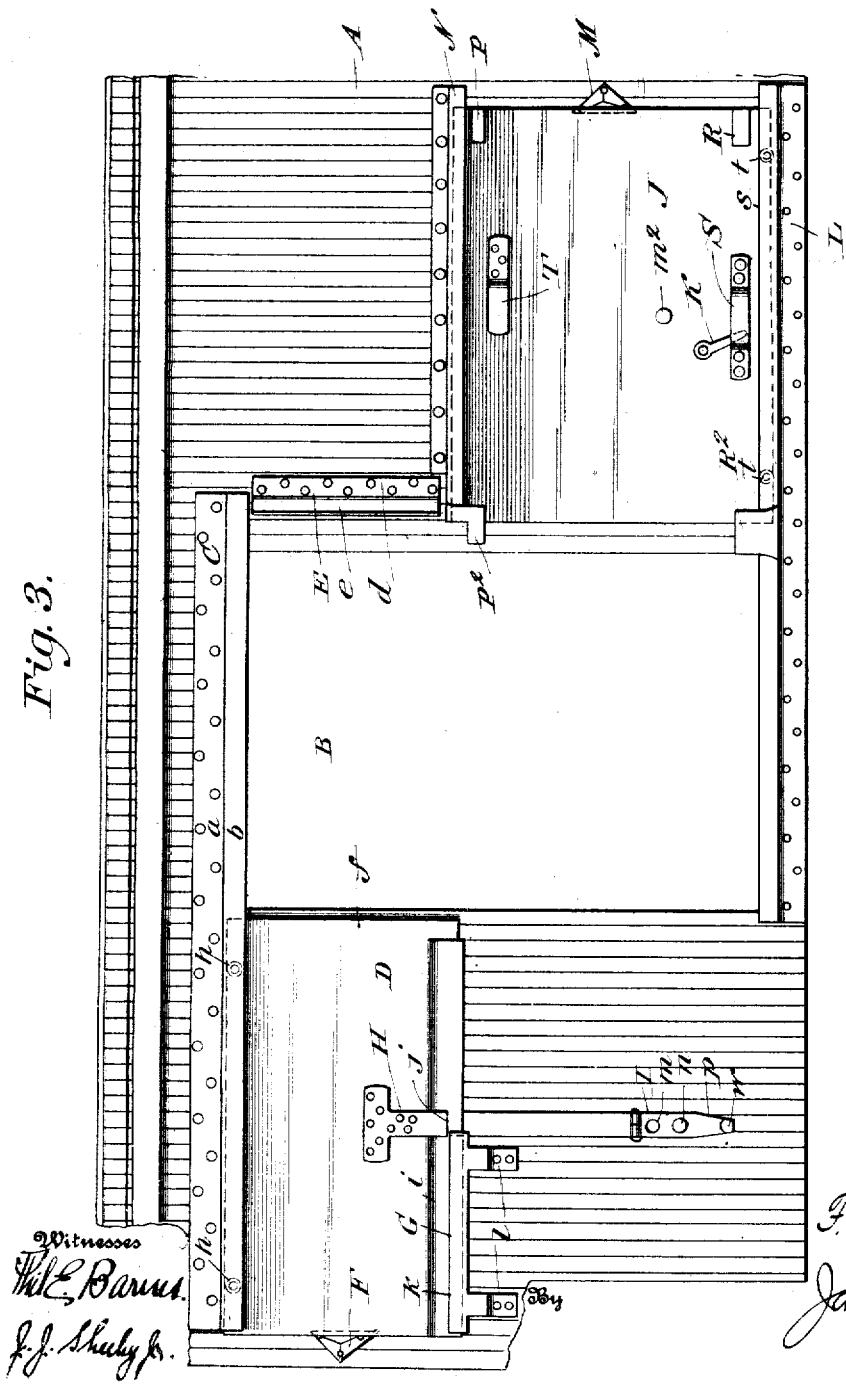
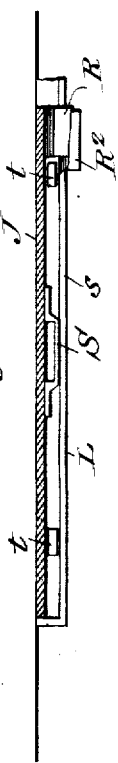

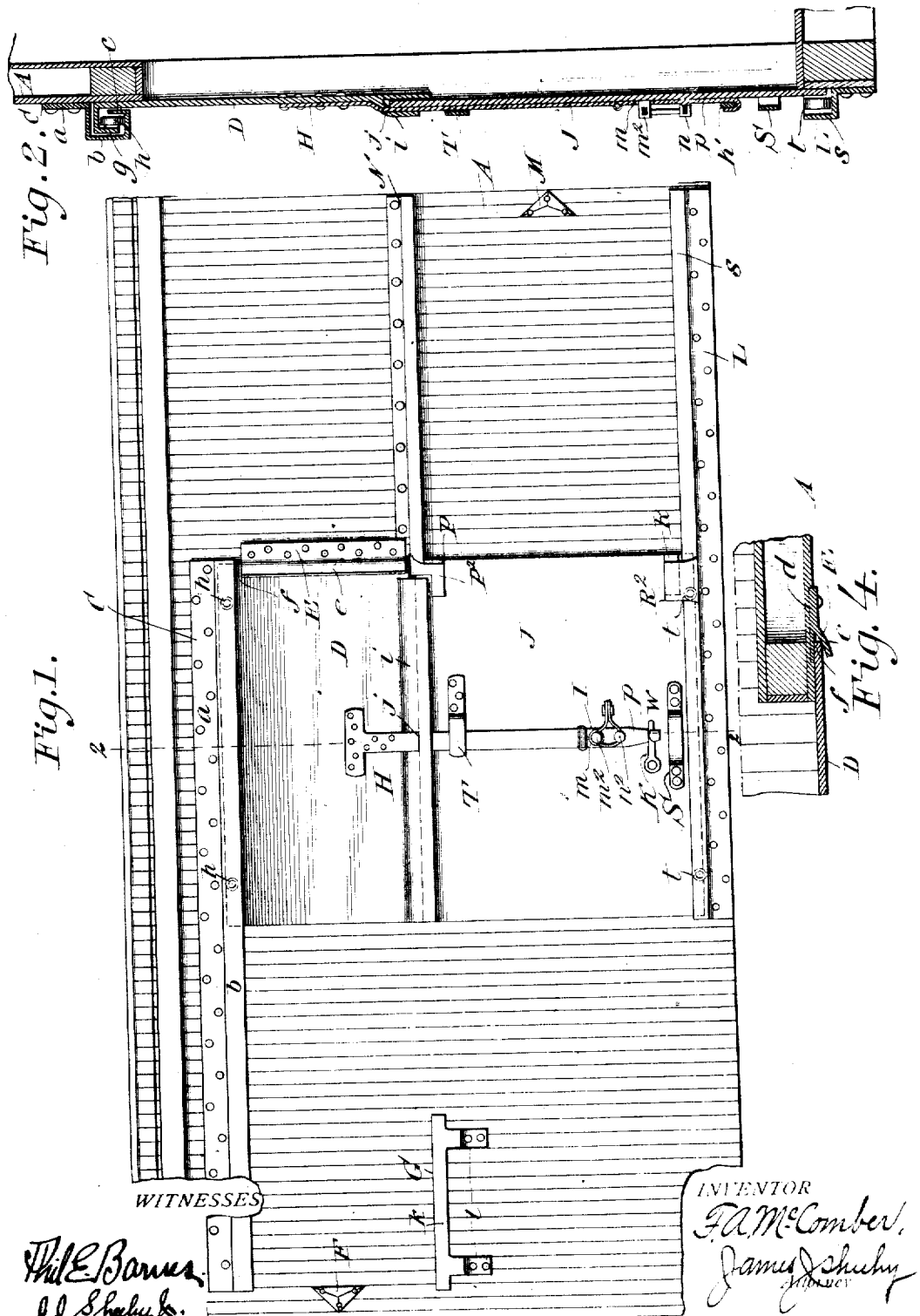

UNITED STATES PATENT OFFICE.

FRANK AUSTIN McCOMBER, OF MARSHALLTOWN, IOWA, ASSIGNOR OF ONE-HALF TO F. H. GIFFORD, OF MARSHALLTOWN, IOWA.

CAR-DOOR.

954,326.

Specification of Letters Patent.

Patented Apr. 5, 1910.

Application filed May 5, 1909. Serial No. 493,994.

*To all whom it may concern:*

Be it known that I, FRANK AUSTIN Mc-COMBER, citizen of the United States, residing at Marshalltown, in the county of Marshall and State of Iowa, have invented new and useful Improvements in Car-Doors, of which the following is a specification.

My invention has to do with freight car doors of the sliding type; and it contemplates the provision of a simple and durable sectional door, constructed with a view of being opened with the expenditure of little effort, and of being tightly closed at all points about a door opening in order to effectually exclude the weather and prevent the escape of the contents of the car when said contents are in bulk.

Other objects and advantageous characteristics of my invention will be fully understood from the following description and claims when the same are read in connection with the drawings, accompanying and forming part of this specification, in which:

Figure 1 is a side elevation of a portion of a car equipped with my improvements and showing both sections of the door as closed. Fig. 2 is a vertical transverse section, taken in the plane indicated by the line 2—2 of Fig. 1. Fig. 3 is an elevation showing the door sections in their open positions. Fig. 4 is a detail horizontal section showing the cooperation of the upper door section and the upright keeper. Fig. 5 is a fragmentary horizontal section hereinafter referred to in detail.

Similar letters designate corresponding parts in all of the views of the drawings, referring to which:

A is the side wall of a freight car in which is an opening B of the conventional or any other shape and size compatible with the purpose of my invention.

C is the fixed horizontal track for the upper door section, and D is the said upper door section as a whole. The track C extends above the opening B and an adequate distance to the left of the same, and is of the configuration illustrated in cross-section— *i. e.*, has an upper flange *a* arranged against and fixedly connected to the outer side of the car, a portion *b* of rectangular form in cross-section extending outwardly from the lower end of the flange *a*, and a shallow flange *c* extending upwardly from the bottom wall of the portion *b* and arranged alongside the plane of the flange *a* so as to lie adjacent the side of the car and enable the said side to assist in guiding the upper door section D. Arranged adjacent the right hand end of the track C is an upright keeper E which is designed to receive the right hand end of the door section D and crowd the same inwardly with a view of contributing to the thorough closing of the door opening at the upper right hand portion thereof. The said upright keeper E is of about the same height as the door section D, and comprises an inner wear portion *d* arranged flat against the side of the car, and an outer portion *e* flared from the portion *d* as illustrated. From this it will be readily understood that when the extended right hand end portion *f* of the door section D enters between the portions *d* and *e* of the keeper E, the joint between the door section and the keeper E will be broken, and the flared outer portion *e* of the keeper will assure the keeper receiving in proper manner the extension *f*, and will also tend to cause the end portion of the door section to bear tight against the plate or portion *d* flat against the side of the car.

In addition to the right hand end extension *f* the upper door section D is provided with an outwardly and downwardly extending flange *g* and with two or more wheels *h* thereon, and is also provided adjacent its lower edge with a skirt flange *i* in which is a vertically disposed aperture *j*. The flange *g* at the top of section D is engaged with the track C in the manner shown, so as to enable the wheels *h* to bear and travel freely on the bottom wall of the track portion *b*. From this it follows that the upper door section D may be opened toward the left with the expenditure of very little effort; the said door section when opened to the full extent being designed to bring up against an abutment F fixed to the side of the car, this in order to prevent accidental disengagement of the said door section from the parts that coöperate therewith.

At the left hand side of the door opening B is arranged a guard G, which has for its office to prevent flapping or casual movement of the lower portion of the door section D away from and toward the side of the car. The said guard G comprises a bar *k* separated by a suitable intervening space from the side of the car body, and brackets *l* carrying the said bar *k* and fixedly connected to the said side of the body. It will be readily understood from this that the guard G is idle when the door section D is closed, and only coöperates with the said door section D when the latter is moved from its closed position.

Fixed to the outer side of the upper door section D and extending downwardly through the aperture *j* in the skirt flange *i* of said section D is a bar H. The said bar H is provided adjacent the lower portion of the door opening of the car with a hinged section I disposed and movable toward and from the outer side of the lower door section J, which latter is preferably, though not necessarily, about twice as high as the upper section D. The hinged section I is provided with an aperture *m*, an apertured pin *n*, and a lower reduced end *p*. The aperture *m* is designed, when the section I is in alinement with the bar H, to receive an apertured pin $m^2$ on the section J, and then a seal may be passed through the apertures of the pins $m^2$ and *n* and suitably secured. At the same time the lower end of the section I may be engaged by a swinging keeper K, mounted on the door section J and adapted to prevent movement of the section I, bar H and door section D toward the left. When, however, the keeper K is swung out of engagement with the section I, and the seal is broken, the said section I may be swung outwardly, and then may be used as a convenient handle to move the upper door section D toward the left. It will also be noted that the section I is adapted to be used to advantage as a handle in moving the upper door section D to its closed position, and that the said section I may be conveniently reached by a trainman standing upon the ground. Then when both door sections D and J are relatively arranged as shown in Fig. 1, the section I may be swung into alinement with the bar H, and engaged with the keeper K, and then the car may be sealed in the manner before described.

The lower door section J when closed rests in a lower track L and between the flange *s* of said track and the lower portion of the upper door section D; the upper edge of the said section J being received between the skirt flange *i* and the major portion of the section D, whereby, as will be manifest, a tight joint is effected between the closed section—*i. e.*, a joint that will shed rain and prevent the contents of the car being affected by the weather, and will also prevent the escape of any portion of the contents of the car. The section J is provided with wheels *t* to render easy its movement on track L, and, as will be readily seen by reference to Fig. 1, the said track L extends an adequate distance to the right of the door opening B, and at the proper point on the side of the car body an abutment M is provided for limiting the opening movement of the door section J.

It will be noted here that the interlocking of the adjacent portions of the door sections D and J when closed, serves to hold the said adjacent portions together; also, that during the initial portion of the movement of the section J toward the right, the upper portion of the said section will be guided and held against lateral deflection by the lower portion of the section D, and after said initial movement, the upper edge of the section J will move in a fixed retainer N, which extends a suitable distance toward the right from the door opening B, and serves to prevent casual outward movement of the section J when the latter is in its open position. At P and R, the lower door section J is provided with lugs of taper form, which serve, incidental to the completion of the opening movement of the said section J, to coöperate with complementary tapered lugs $P^2$ and $R^2$ on the track L and retainer N, respectively, to bring about pressing of the section J firmly and tightly against the side of the car with a view of contributing to the thorough closing of the door opening B.

In addition to the appurtenances hereinbefore mentioned, the lower door section J is provided with a suitable handle S, and a hook T; the latter being adapted when both door sections D and J are closed, to receive the bar H and serve to brace and strengthen the connection between the said sections. The upper door section D is prevented by the upright keeper E from moving toward the right beyond its closed position, and the lower door section J is prevented, by the closed left hand end of the track L, from moving toward the left beyond its closed position. Consequently when the doors or door sections are connected together in the manner shown in Fig. 1, there is no liability of either tending to move accidentally from its closed position. When desired the catch or keeper K may be used only when no seal is used, the lower end of the section I being hooked, as indicated by *w*, to prevent casual downward movement of the said catch or keeper.

In the practical use of my improvements, the section J alone may be used as a grain door, in which event the section D may be suitably secured between the top track C and the side of the car, and also between the guard G and the side of the car, and any suitable means that I have deemed it unnecessary to illustrate may be employed for detachably fastening the said section J in its closed position.

I prefer in practice to make all of the parts of my improvements of metal, but it will be readily appreciated that notwithstanding the sections D and J are of metal, each of the same is susceptible of being very easily moved in opposite directions.

I have entered into a detailed description of the construction and relative arrangement of the parts comprised in the present and preferred embodiment of my invention in order to impart a full, and exact understanding of the said embodiment, but it is obvious that in the future practice of the invention changes in the form, construction and relative arrangement of parts may be made provided said changes do not involve departure from the scope of my invention as defined in the claims appended.

Having described my invention, what I claim and desire to secure by Letters-Patent, is:

1. In a car door, the combination of a lower track extending below and beyond one side of the door opening in a car body and fixed to said body, an upper track also fixed to the car body and extending above the door opening and beyond the opposite side thereof, a door retainer fixed to the car body and arranged above the extended portion of the lower track, a guard fixed to the car body and arranged below the extended portion of the upper track, a lower door section movable on the lower track and between the extended portion of the same and the retainer, an upper door section movable on the upper track and between the extended portion of the same and the guard, and means on one of the door sections, adjacent the other door section, receiving the edge portion of such other section.

2. In a car door, the combination of a lower track extending below and beyond one side of the door opening in a car body and fixed to said body, an upper track also fixed to the car body and extending above the door opening and beyond the opposite side thereof, a door retainer fixed to the car body and arranged above the extended portion of the lower track, a guard fixed to the car body and arranged below the extended portion of the upper track, a lower door section movable on the lower track and between the extended portion of the same and the retainer, an upper door section movable on the upper track and between the extended portion of the same and the guard, and having a portion adapted to rest at the inner side of the lower section and another portion adapted to rest at the outer side of the lower section and also having an aperture in the latter portion, a bar fixed to the upper section and extending downwardly through the said aperture, and means detachably connecting the said bar to the lower section.

3. In a car door, the combination of a lower track extending below and beyond one side of the door opening in a car body and fixed to said body, an upper track also fixed to the car body and extending above the door opening and beyond the opposite side thereof, a door retainer fixed to the car body and arranged above the extended portion of the lower track, a guard fixed to the car body and arranged below the extended portion of the upper track, a lower door section movable on the lower track and between the extended portion of the same and the retainer, an upper door section movable on the upper track and between the extended portion of the same and the guard, and having a portion adapted to rest at the inner side of the lower section and another portion adapted to rest at the outer side of the lower section and also having an aperture in the latter portion, a bar fixed to the upper section and extending downwardly through the said aperture, a section hinged to said bar in position to swing toward and from the lower door section and adapted to serve as a handle, and means for detachably securing the said handle section to the lower door section and for preventing movement of the said handle section with the bar and upper door section and with respect to the lower door section.

4. In a car door, the combination of a lower track extending below and beyond one side of the door opening in a car body and fixed to said body, an upper track also fixed to the car body and extending above the door opening and beyond the opposite side thereof, a door retainer fixed to the car body and arranged above the extended portion of the lower track, a guard fixed to the car body and arranged below the extended portion of the upper track, an upright keeper arranged at the opposite side of the door opening, with reference to the guard, and having an inner wear plate or portion and an outer portion fixed to and flared from the wear plate or inner portion, a lower door section movable on the lower track and between the extended portion of the same and the retainer, an upper door section movable on the upper track and between the extended portion of the same and the guard and having an extended end portion adapted to enter and be held in the upright keeper, means on the lower door section, and means on the extended portion of the lower track and the retainer for crowding the lower door section in its closed position against the car body.

5. The combination in a car door, of a lower, slidable door section, an upper, slidable door section having an inner portion adapted to rest at the inner side of the lower section, and also having a portion adapted to rest at the outer side of the lower section and provided with a vertically disposed aperture, a bar fixed to the upper section and extending downwardly through said aperture, a hook carried by the lower section and adapted to engage said bar, a section hinged to the bar at the lower end thereof and arranged to be swung toward and from the lower section, and means detachably connecting the said section with the lower door section.

6. The combination in a car door, of a lower slidable door section, an upper slidable door section movable independently of the lower section and having an inner portion adapted to rest at the inner side of the lower section and also having a portion adapted to rest at the outer side of the lower section and provided with an aperture, and a bar fixed to the upper section and extending downwardly through said aperture.

In testimony whereof I have hereunto set my hand in presence of two subscribing witnesses.

FRANK AUSTIN McCOMBER.

Witnesses:
F. E. NORTHUP,
H. C. THEDE.